United States Patent [19]
Hirotani

[11] Patent Number: 5,982,887
[45] Date of Patent: Nov. 9, 1999

[54] ENCRYPTED PROGRAM EXECUTING APPARATUS

[75] Inventor: Takayuki Hirotani, Yokohama, Japan

[73] Assignee: Casio Computer Co., Ltd., Tokyo, Japan

[21] Appl. No.: 08/765,861

[22] PCT Filed: Apr. 18, 1996

[86] PCT No.: PCT/JP96/01051

§ 371 Date: Dec. 26, 1996

§ 102(e) Date: Dec. 26, 1996

[87] PCT Pub. No.: WO96/34334

PCT Pub. Date: Oct. 31, 1996

[30] Foreign Application Priority Data

Apr. 27, 1995 [JP] Japan .................................. 7-104048

[51] Int. Cl.$^6$ .................................................. H04L 9/00
[52] U.S. Cl. .................................................... 380/4
[58] Field of Search ...................................... 380/4

[56] References Cited

U.S. PATENT DOCUMENTS

| | | | |
|---|---|---|---|
| 4,168,396 | 9/1979 | Best ............................................ | 380/4 |
| 4,433,207 | 2/1984 | Best ............................................ | 380/4 |
| 4,633,388 | 12/1986 | Chiu ............................................ | 380/4 |
| 4,764,959 | 8/1988 | Watanabe et al. ........................... | 380/4 |
| 5,153,921 | 10/1992 | Kawarabayashi ............................ | 380/4 |
| 5,544,244 | 8/1996 | Ogura ......................................... | 380/4 |

FOREIGN PATENT DOCUMENTS

| | | |
|---|---|---|
| 59-212954 | 12/1984 | Japan . |
| 59-229646 | 12/1984 | Japan . |
| 3-148734 | 6/1991 | Japan . |
| 4-268924 | 9/1992 | Japan . |
| 4-287124 | 10/1992 | Japan . |

OTHER PUBLICATIONS

The Transactions of The Institute of Electronics Information And Communication Engineers (IEICE), J70–D(1) (1987) Ryoichi Mori, Shuichi Tashiro "Proposal of the Software Service System (SSS)", pp. 70–81.

*Primary Examiner*—Salvatore Cangialosi
*Attorney, Agent, or Firm*—Skjerven, Morill, MacPherson Franklin and Friel; Alan H. MacPherson; Fabio E. Marino

[57] ABSTRACT

An encrypted part of the encrypted program loaded in an memory device is received by a one-chip microcomputer and decrypted according to a decrypting program which is stored in advance in an ROM and which cannot be read out to an external bus. The decrypted program is stored in an cache memory, and a cache function inhibition flag is set in a control register in accordance with a storage area of the decrypted program in the cache memory. Therefore, the decrypted program is inhibited from being read out to the external bus. The decrypted program is combined with the non-encrypted part of the program stored in the memory device, and the combined program is executed by a CPU. The encrypted program is prevented from being illegally copied.

4 Claims, 7 Drawing Sheets

ENCRYPTED PROGRAM EXECUTING APPARATUS

TECHNICAL FIELD

The present invention relates to an encrypted program executing apparatus loaded into a computer or the like which has a function of decrypting an encrypted program and executing the decrypted program.

BACKGROUND ART

A variety of types of software have recently been contrived in accordance with the remarkable spread of computers and can be utilized as general-purpose software irrespective of a type of computer. However, an illegal copy of software is increasing and thus some measures have to be taken immediately to prevent an illegal copy.

As one measure to prevent software from being illegally copied, there is provided a copy prevention method wherein a software is encrypted and only an authorized user is informed of a decrypting program and the encrypted software is decrypted before execution.

The conventional encryption is performed mainly using a software conversion algorithm. The more complicated the conversion algorithm, the more difficult the decryption of software, however, it is actually very hard to create such an encryption algorithm. Further, the conventional encryption method has drawbacks in which a decrypting program itself is copied and the encrypted software is decrypted and the decrypted program is copied and used, and so on.

Stated another way, the copy of the software is prevented in the conventional system by a software method using a password. However, the software method is not an almighty measure and can not perfectly prevent an illegal copy. It is possible to completely copy the software. The complete copy can not be distinguished from the original.

The present invention has been developed in consideration of the above and its object is to provide an encrypted program executing apparatus capable of preventing an encrypted program from being copied and used.

DISCLOSURE OF INVENTION

According to a first aspect of the present invention, there is provided an encrypted program executing apparatus for executing an encrypted program at least a part of which is encrypted, the apparatus comprising first memory means for storing a decrypting program, means for decrypting the encrypted program by using the decrypting program stored in the first memory means, second memory means for storing a program decrypted by the decrypting means, and means for inhibiting the decrypted program stored in the second memory means from being read out.

According to a second aspect of the present invention, there is provided an encrypted program according to the first aspect, in which the decrypting means comprises a CPU, formed in an LSI, for executing the decrypting program stored in the first storing means, and the second storing means comprises a cache memory formed in the LSI.

According to a third aspect of the present invention, there is provided an encrypted program according to the second aspect, in which the inhibiting means comprises a control register, formed in the LSI, to which an inhibit flag is set when the decrypting program is executed, and a cache function of the cache memory is inhibited if the inhibit flag is set in the control register.

According to a fourth aspect of the present invention, there is provided an encrypted program according to the second aspect, in which the inhibiting means comprises a flip-flop, formed in the LSI, to which an inhibit flag is set when the CPU executes an instruction to write the decrypted program into the cache memory, and a cache function of the cache memory is inhibited if the inhibit flag is set in the flip-flop.

According to a fifth aspect of the present invention, there is provided an encrypted program according to the second aspect, which further comprises means for inputting a program, third memory means for storing a specific information of the apparatus, and in which when the inputting means inputs a program including a password calculation program which is encrypted, the CPU decrypts the password calculation program, stores the decrypted password calculation program in the second memory means, calculates the password based on the specific information using the decrypted password calculation program, and compares the calculated password and a password input by a user.

According to a sixth aspect of the present invention, there is provided an encrypted program according to the second aspect, which further comprises means for inputting a program, and in which when the inputting means inputs a program including a copyright claiming program for displaying a copyright claiming message and a processing program at least a part of which is encrypted, the CPU decrypts the encrypted copyright claiming program and displays the copyright claiming message.

BEST MODE OF CARRYING OUT THE INVENTION

A preferred embodiment of an encrypted program executing apparatus according to the present invention will now be described with reference to the accompanying drawings.

Figure 1:
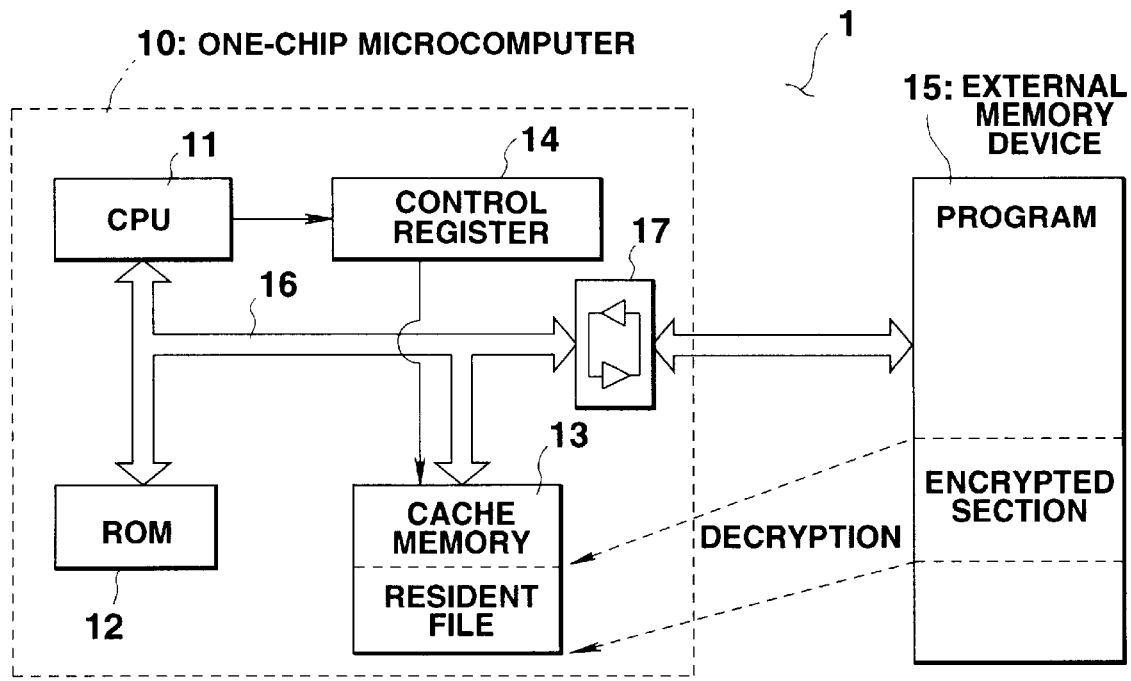
FIG. 1 is a block diagram showing a computer loaded with an encrypted program executing apparatus according to a first embodiment of the present invention.

FIG. 1 is a block diagram of the whole configuration of a computer loaded with an encrypted program executing apparatus according to a first embodiment of the present invention. The computer comprises a one-chip microcomputer 10 and an external memory device 15. The one-chip microcomputer 10 comprises a CPU (Central Processing Unit) 11 for controlling the whole apparatus. The CPU 11 controls the operations of the respective circuits in the computer according to the programs stored in advance in an internal ROM (Read Only Memory) 12. The one-chip microcomputer 10 also comprises a cache memory 13 and a control register 14 for storing control data for controlling a cache function of the cache memory 13. The ROM 12 and cache memory 13 are connected to the CPU 11 through a system bus 16 formed of a data bus, address bus and control bus.

The cache memory 13 is so constituted that a cache function (purging and writing of data) for a storage area is inhibited or allowed in accordance with a set "1" or reset "0" of a flag stored in the control register 14 and corresponding to the storage area. When the cache function for a given area is inhibited, the data stored in the area can be resident data. The CPU 11 sets and resets the flag.

The system bus 16 of the one-chip microcomputer 10 is connected to the memory device 15 via an I/O buffer 17. A portion of the bus between the I/O buffer 17 and the memory device 15 is called an external bus. The memory device 15 stores two types of programs including an encrypted program which must be decrypted before execution and a non-encrypted program. The whole program is not necessarily encrypted, but it is sufficient that at least a part of the program is encrypted. The memory device 15 is not limited to a semiconductor memory device, but may be a memory card, hard disk drive and floppy disk drive. It is possible to down load programs into the memory device 15 from a network.

When reading a program stored in the memory device 15, the CPU 11 performs a control operation in accordance with the program. A decrypting program is previously written in the ROM 12. When the encrypted program is read, the program is executed after an encrypted portion thereof is decrypted. The decrypted program is stored in the cache memory 13 as a resident file. If the program read from the memory device 15 is a non-encrypted program, the CPU 11 executes the program using a cache function for all areas of the cache memory 13. Since the I/O buffer 17 is connected between the system bus 16 and the external bus (memory device 15), the contents of the ROM 12 including the decrypting program cannot be read out of the one-chip microcomputer 10.

An operation of executing an encrypted program in the computer loaded with an encrypted program executing apparatus having the above configuration according to the first embodiment, will now be described.

Figure 2:
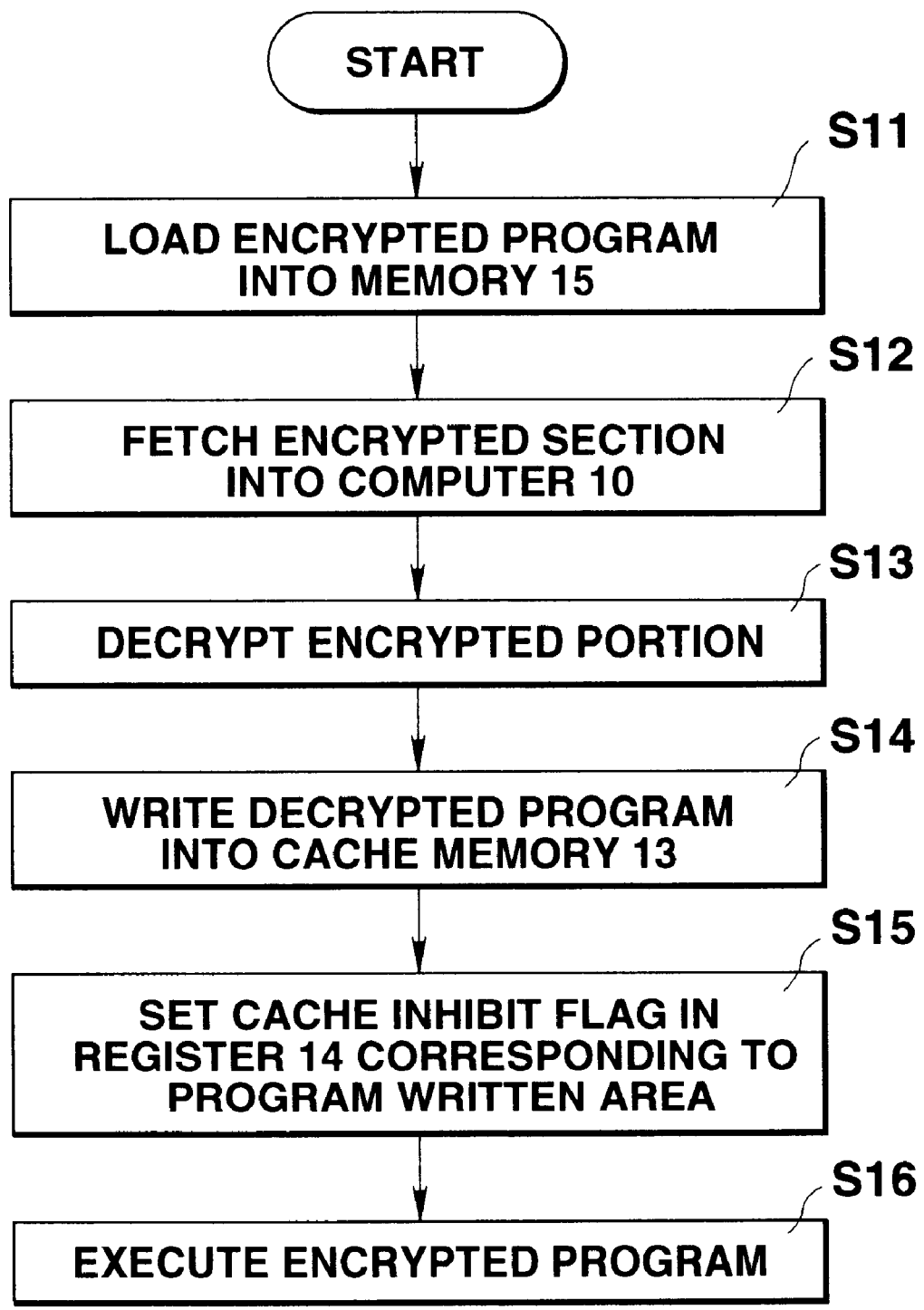
FIG. 2 is a flowchart showing a sequence of execution of an encrypted program according to the first embodiment of the present invention.

FIG. 2 is a flowchart showing a process of executing the encrypted program in the computer loaded with the encrypted program executing apparatus according to the first embodiment.

At step S11, an encrypted program which must be decrypted is loaded into the memory device 15. A part or whole of the program is encrypted irrespective of command and data and information indicative of an encrypted program is added to the header of the program or the like. Based on the information added to the header or the like, the CPU 11 determines that the program read out from the memory device 15 is an encrypted program.

At step S12, the encrypted part of the read program is taken into the CPU 11. At step S13, the encrypted part is decrypted.

When the encrypted part of the program is taken into the CPU 11, the encrypted part is decrypted in accordance with the decrypting program stored in the ROM 12. The decrypted program is written into the cache memory 13 at step S14.

As described above, since the contents of the ROM 12 cannot be read out to the external bus, it is unlikely that the algorithm of the decrypting program will be analyzed by a third party.

After the encrypted part of the encrypted program is decrypted and this decrypted program is written into the cache memory 13, a cache inhibit flag stored in the control register 14 and controlling a cache function, such as a data purge of a storage area of the memory 13 where the decrypted program is written, is set at step S13. Therefore, the decrypted program is inhibited from being read out to the external bus.

The decrypted program written to the cache function inhibition area of the cache memory 13, is combined with a non-encrypted part of the encrypted program loaded in the memory device 15. The combined program is executed by the CPU 11 (step S16). Of the encrypted program loaded in the memory device 15, the encrypted part is decrypted and stored in the cache memory 13 as a resident file, whereas the non-encrypted part is executed through a normal cache function using the remaining part of the cache memory 13.

When the encrypted program need not be executed, the decrypted part stored in the cache memory 13 is erased, and the cache function inhibition flag set in the control register 14 in accordance with the storage area corresponding of the decrypted program is reset to release the cache function inhibition.

According to a computer loaded with the encrypted program executing apparatus according to the first embodiment, the encrypted part of the encrypted program loaded in the memory device 15 is taken in the one-chip microcomputer 11 and is decrypted based on the decrypting program stored in advance in the ROM 12 which cannot be read out to the external bus. The decrypted program is written in the cache memory 13, and a flag stored in the control register 14 and corresponding to the storage area of the decrypted program is set, thereby inhibiting the cache function of the storage area and decrypted program from being read out to the external bus. The decrypted program stored in the cache memory 13 and the non-encrypted program stored in the memory device 15 are combined and executed by the CPU 11. Therefore, the conventional drawbacks wherein the decrypting program itself is copied and the encrypted program is decrypted or the decrypted program is copied and used, can be eliminated by a simple modification to the configuration of the computer.

When an encrypted program is decrypted by its dedicated decrypting program in a specific computer, an encrypted program executing apparatus with high reliability, which prevents the decrypting program or decrypted program from being read out by a third party, can be provided.

In the above embodiment, when the decrypted program is written to the cache memory 13, the cache function in its storage area is inhibited by the control register 14, and the decrypted program is inhibited from being sent out to the external bus. If, as in an encrypted program executing apparatus according to a second embodiment of the present invention shown in FIGS. 3 and 4, an instruction (enforced write instruction) to write a decrypted program to the cache memory 13 and simultaneously to add a cache inhibition flag is included in the system program of a CPU 21, the foregoing control register 14 for inhibiting the cache function and releasing the inhibition is unnecessary, thus making it more difficult to read out the decrypted program.

Other embodiments of the encrypted program executing apparatus according to the present invention will be described.

Figure 3:
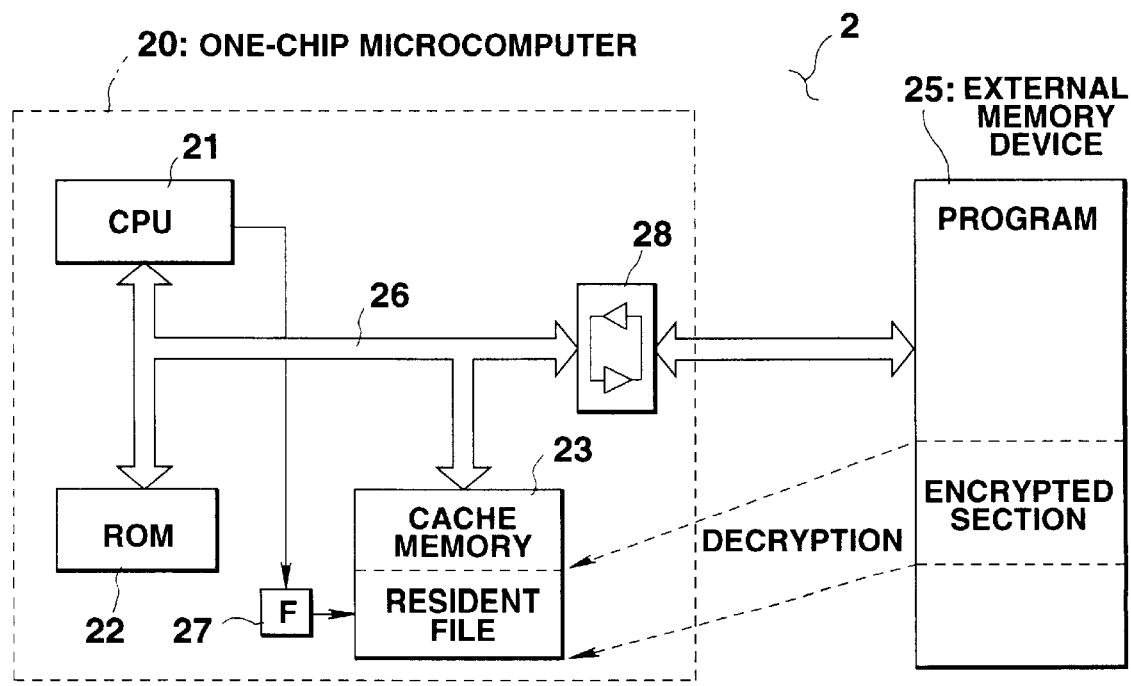
FIG. 3 is a block diagram showing a computer loaded with an encrypted program executing apparatus according to a second embodiment of the present invention.

FIG. 3 is a block diagram of the whole configuration of a computer loaded with an encrypted program executing apparatus according to a second embodiment of the present invention. The computer comprises a one-chip microcomputer 20 and an external memory device 25. The one-chip microcomputer 20 comprises a CPU 21 for controlling the whole apparatus. The CPU 21 controls the operations of the respective circuits in the computer according to the programs stored in advance in an internal ROM 22. The one-chip microcomputer 20 also comprises a cache memory 23 and a flip-flop 27 for storing control data for controlling a cache function of the cache memory 23. The ROM 22 and cache memory 23 are connected to the CPU 21 through a system bus 26 formed of a data bus, address bus and control bus.

The cache memory 23 is so constituted that a cache function (purging and writing of data) for a predetermined storage area is inhibited when the data is written into the storage area by the CPU 21 with an enforced write instruction. The flip-flop 27 is provided in correspondence with the predetermined storage area of the cache memory 23 into which the data is written under the enforced write instruction. Therefore, when the CPU 21 writes data into the cache memory 23 under the enforced write instruction, the flag is set in the flip-flop 27 so that the cache function of the cache memory 23 is inhibited. When the cache function is inhibited, the data in the cache memory 23 can be resident data.

The system bus 26 of the one-chip microcomputer 20 is connected to the memory device 25 via an I/O buffer 28. A portion of the bus between the I/O buffer 27 and the memory device 25 is called an external bus. The memory device 25 stores two types of programs including an encrypted program which must be decrypted before execution and a non-encrypted program. The whole program is not necessarily encrypted, but it is sufficient that at least a part of the program is encrypted. The memory device 25 is not limited to a semiconductor memory device, but may be a memory card, hard disk drive and floppy disk drive. It is possible to down load programs into the memory device 25 from a network.

When reading a program stored in the memory device 25, the CPU 21 performs a control operation in accordance with the program. A decrypting program is previously written in the ROM 22. When the encrypted program is read, the program is executed after an encrypted portion thereof is decrypted. The decrypted program is stored in the cache memory 23 as a resident file. If the program read from the memory device 25 is a non-encrypted program, the CPU 21 executes the program using a cache function for all areas of the cache memory 23. Since the I/O buffer 28 is connected between the system bus 26 and the external bus (memory device 15), the contents of the ROM 22 including the decrypting program cannot be read out of the one-chip microcomputer 20.

An operation of executing an encrypted program in the computer loaded with an encrypted program executing apparatus having the above configuration according to the second embodiment, will now be described.

Figure 4:
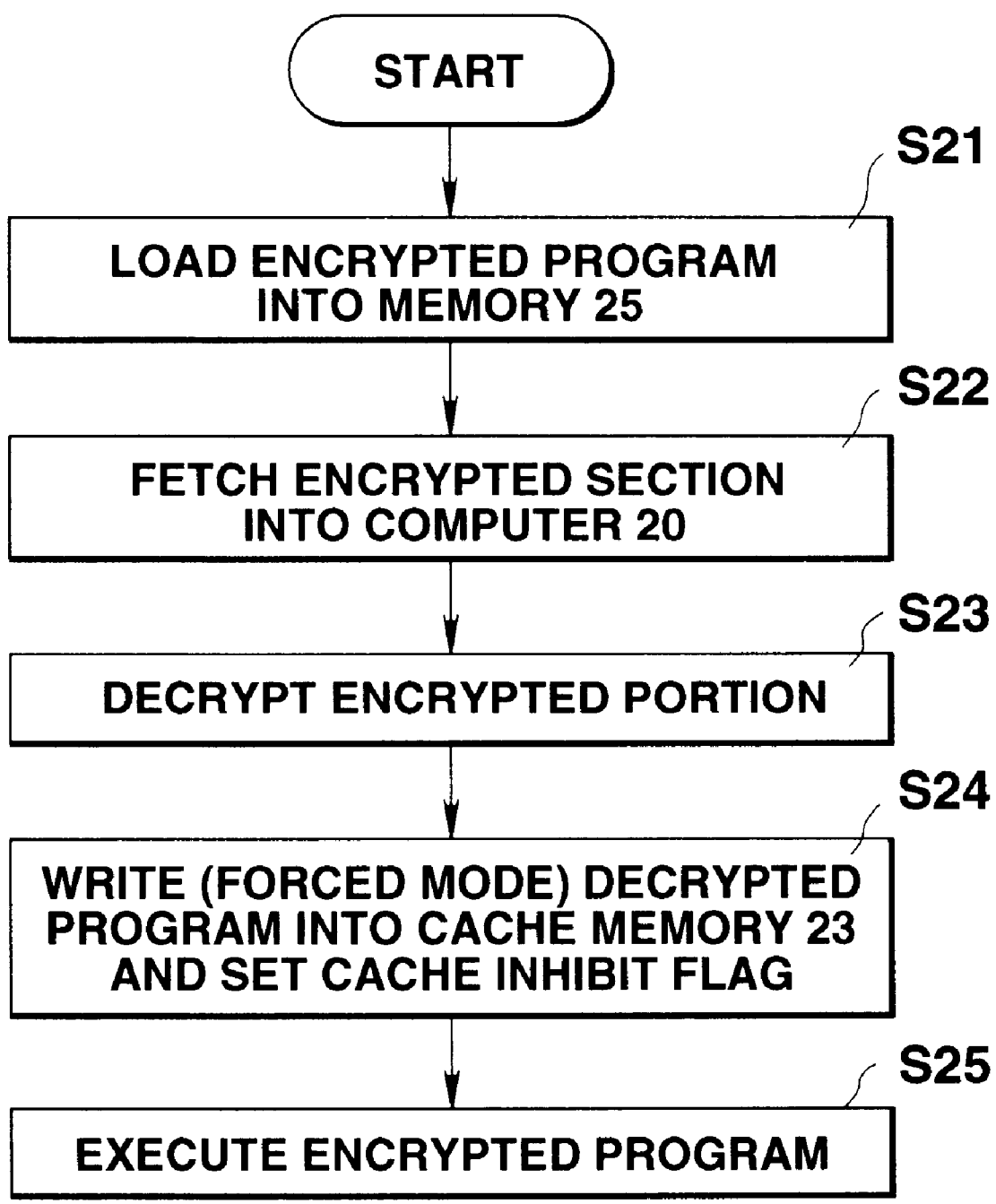
FIG. 4 is a flowchart showing a sequence of execution of an encrypted program according to the second embodiment of the present invention.

FIG. 4 is a flowchart showing a process of executing the encrypted program in the computer loaded with the encrypted program executing apparatus according to the second embodiment.

At step S21, an encrypted program which must be decrypted is loaded into the memory device 25. A part or whole of the program is encrypted irrespective of command and data and information indicative of an encrypted program is added to the header of the program or the like. Based on the information added to the header or the like, the CPU 21 determines that the program read out from the memory device 25 is an encrypted program.

At step S22, the encrypted part of the read program is taken into the CPU 21. At step S23, the encrypted part is decrypted.

When the encrypted part of the program is taken into the CPU 21, the encrypted part is decrypted in accordance with the decrypting program stored in the ROM 22. The decrypted program is written into a predetermined storage area of the cache memory 23 at step S24. This data writing is performed by an enforced write instruction of the CUP 21 and a cache inhibiting flag is set in the flip-flop 27 as well as the data writing so that the decrypted program is prevented from being read out to the external bus.

As described above, since the contents of the ROM 22 cannot be read out to the external bus, it is unlikely that the algorithm of the decrypting program will be analyzed by a third party.

The decrypted part of the encrypted program which is written into the cache inhibiting area of the cache memory 23 is combined with a non-encrypted part of the encrypted program loaded in the memory device 25. The combined program is executed by the CPU 21 (step S25). Of the encrypted program loaded in the memory device 15, the encrypted part is decrypted and stored in the cache memory 23 as a resident file, whereas the non-encrypted part is executed through a normal cache function using the remaining part of the cache memory 23.

When the encrypted program need not be executed, the cache function inhibition flag set in the flip-flop 27 is reset and the decrypted program stored in the cache memory 23 is erased.

According to a computer loaded with the encrypted program executing apparatus according to the second embodiment, the encrypted part of the encrypted program loaded in the memory device 25 is taken in the one-chip microcomputer 20 and is decrypted based on the decrypting program stored in advance in the ROM 22 which cannot be read out to the external bus. The decrypted program is written in the cache memory 23 under the enforced write instruction, and a flag for inhibiting the cache function of the storage area of the cache memory 23 is set in the flip-flop 27. The decrypted program stored in the cache memory 23 and the non-encrypted program stored in the memory device 25 are combined and executed by the CPU 21. Therefore, the conventional drawbacks wherein the decrypting program itself is copied and the encrypted program is decrypted or the decrypted program is copied and used, can be eliminated by a simple modification to the configuration of the computer.

The present embodiment uses the flip-flop 27 for storing the cache inhibit flag instead of the control register 14 of the first embodiment. The control register 14 may be accessed from the outside and the cache inhibit flag may be reset. However, the flip-flop 27 cannot be accessed from the outside.

As described above, the prior art has a drawback in that the dead copy cannot be distinguished from the original program. Hereinafter described is a third embodiment which checks an illegal execution of an illegal copy of the program by using a specific data of the device executing the program.

Figure 5:
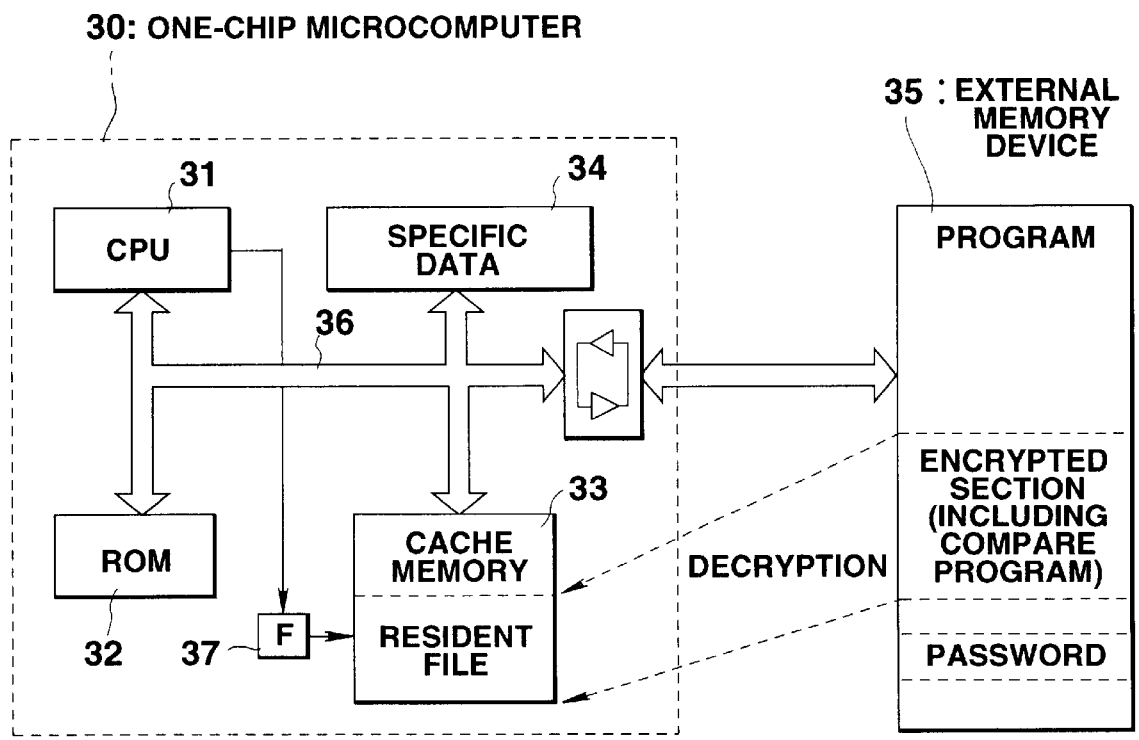
FIG. 5 is a block diagram showing a computer loaded with an encrypted program executing apparatus according to a third embodiment of the present invention.

FIG. 5 is a block diagram of the whole configuration of a computer loaded with an encrypted program executing apparatus according to a third embodiment of the present invention. The computer comprises a one-chip microcomputer 30 and an external memory device 35. The one-chip microcomputer 30 comprises a CPU 31 for controlling the whole apparatus. The CPU 31 controls the operations of the respective circuits in the computer according to the programs stored in advance in an internal ROM 32. The one-chip microcomputer 30 also comprises a cache memory 33, a nonvolatile memory 34 for storing a specific data of the device, such as a serial number of the computer and a flip-flop 37 for storing control data for controlling a cache function of the cache memory 33. The ROM 32, cache memory 33 and nonvolatile memory 34 are connected to the CPU 31 through a system bus 36 formed of a data bus, address bus and control bus.

The cache memory 33 is so constituted that a cache function (purging and writing of data) for a predetermined storage area is inhibited when the data is written into the storage area by the CPU 31 with an enforced write instruction. The flip-flop 37 is provided in correspondence with the predetermined storage area of the cache memory 33 into which the data is written under the enforced write instruction. Therefore, when the CPU 31 writes data into the cache memory 33 under the enforced write instruction, the flag is set in the flip-flop 37 so that the cache function of the cache memory 33 is inhibited. When the cache function is inhibited, the data in the cache memory 33 can be resident data.

The system bus 36 of the one-chip microcomputer 30 is connected to the memory device 35 via an I/O buffer 38. A portion of the bus between the I/O buffer 37 and the memory device 35 is called an external bus. The memory device 35 stores a software program purchased form a software company (at least a part of which is encrypted), a password determined by the software company at the time of purchase and an encrypted comparison program. The memory device 35 is not limited to a semiconductor memory device, but may be a memory card, hard disk drive and floppy disk drive. It is possible to down load programs into the memory device 35 from a network.

When reading a program stored in the memory device 35, the CPU 31 performs a control operation in accordance with the program. A decrypting program is previously written in the ROM 32. When the encrypted program is read, the program is executed after an encrypted portion thereof is decrypted. The decrypted program is stored in the cache memory 33 as a resident file. If the program read from the memory device 35 is a non-encrypted program, the CPU 31 executes the program using a cache function for all areas of the cache memory 33. Since the I/O buffer 38 is connected between the system bus 36 and the external bus (memory device 35), the contents of the ROM 32 including the decrypting program cannot be read out of the one-chip microcomputer 30.

Figure 6:
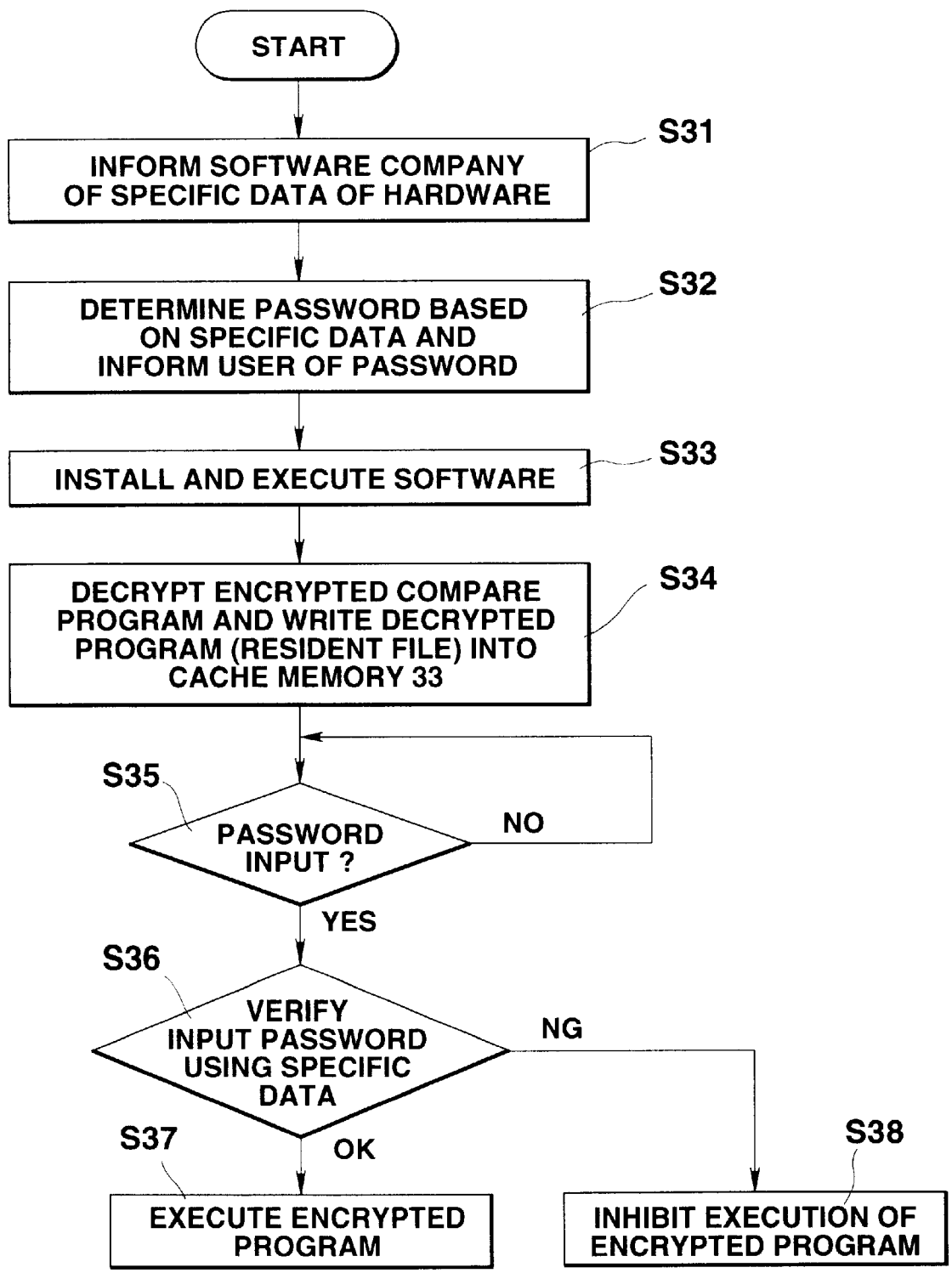
FIG. 6 is a flowchart showing a sequence of execution of an encrypted program according to the third embodiment of the present invention.

An operation of checking an execution of an illegal copy of the software in the computer loading an encrypted program executing apparatus having the above configuration according to the third embodiment, will now be described with reference to a flowchart shown in FIG. 6.

As shown in step S31, the user informs the software company or the software shop of the serial number of the computer as the specific data at the time of purchasing the software.

At step S32, the software company or the software shop determines a password based on the serial number by using a predetermined program and informs the user of the password. In fact, the password is written in the software program which is purchased by the user. The purchased program also contains a comparison program (function thereof will be described later) including the above-mentioned predetermined program in an encrypted form.

When the software is utilized, as shown in step S33, the software is installed in the memory device 35 and starts.

Immediately after the start of the program, at step S34, the encrypted comparison program in the software program is taken into the one-chip microcomputer 30 and decrypted by means of the decrypting program stored in the ROM 32. The decrypted comparison program is stored in the cache memory 33 as a resident file.

When the comparison program starts, a message for prompting the user to input a password is displayed at step S35.

When the password is input, the specific data in the memory 34 is calculated in accordance with the predetermined program to obtain a password at step S36. The calculated password is compared with the input password. Since the password is calculated based on the specific data, it is possible to verify the input password, i.e., that the user executing the software is a purchaser of the software by referring to the specific data. The password is not necessarily input by the user but can be automatically read from the memory 35.

If the verification is affirmed, the software is normally executed at step S37. If the verification is not affirmed, the execution of software is inhibited at step S38.

According to the third embodiment, the serial number as the specific data of the computer and the password obtained from the serial number are necessary to execute a software. It is inhibited that the software is executed by a hardware other than that which is registered at the time of purchase of the software. The illegal copy of the software can be prevented in a simple hardware. Since the comparison program including the predetermined program calculating the password is decrypted, the password is never calculate even if the serial number is known.

The specific data is not limited to the serial number. In the case of an electronic notebook, the name of the owner is registered. Therefore, the owner name can be the specific data.

The above description is made for a case in which a user purchases a software package at the shop. It is possible to down load the software program from a communication network. For example, a desired software is cited in a home page of the software company in the internet. The user of the network issues an order for the software. The order list is added with the owner name of the hardware or the card. A password is calculated in accordance with the owner name. When the order is completed, the software is down loaded into the memory device 35. At the time of down load of software, a password is encrypted and the encrypted password is attached to the software. If the down loaded program is to be installed into a hardware, the comparison program starts to check the owner name of the hardware. Therefore, if the down loaded program is to be installed into another hardware, the comparison program issues an NG result so that the illegal install is prevented. Due to this system, the user is not aware of the comparison program.

Hereinafter described is a fourth embodiment as a countermeasure for an illegal dead copy of the program.

Figure 7:
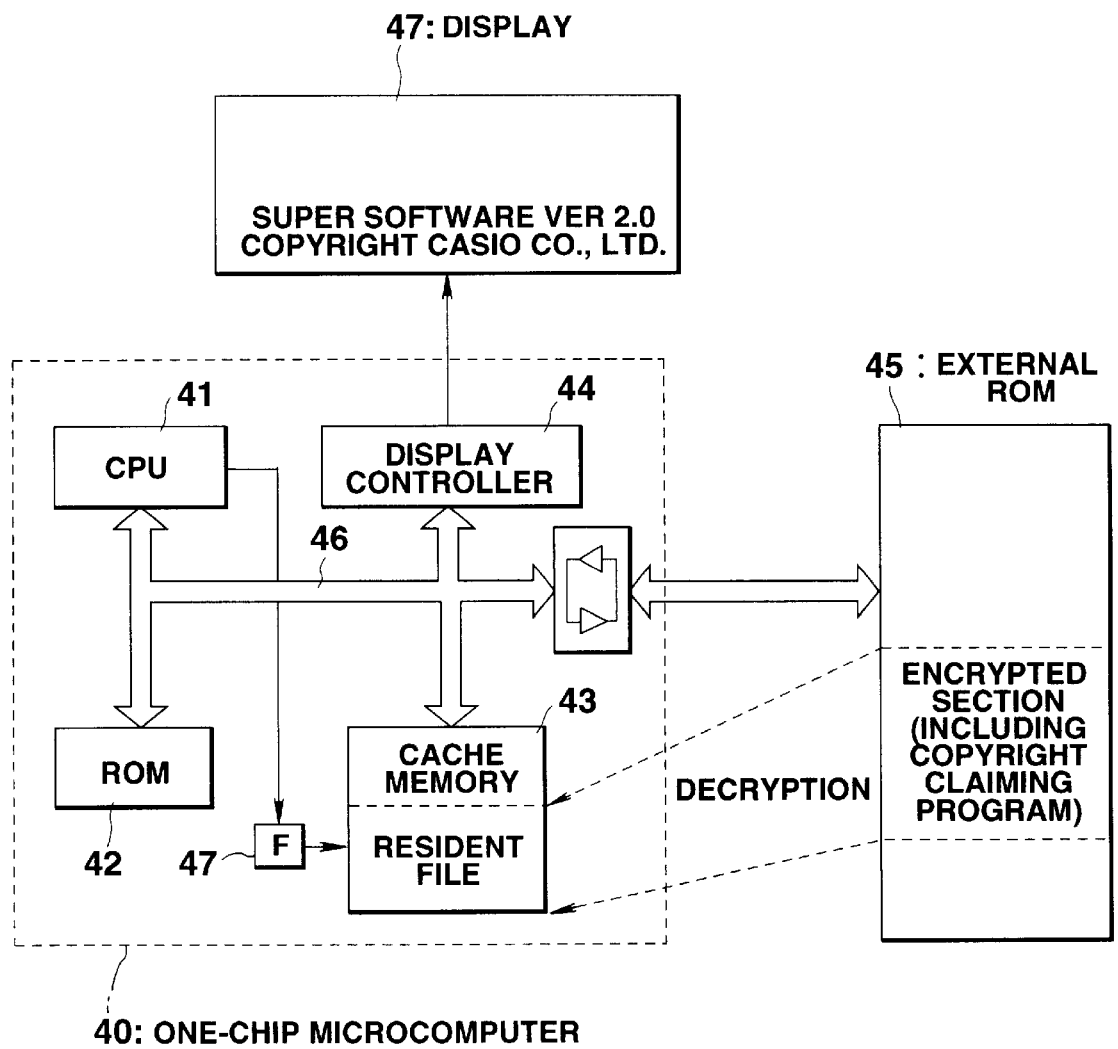
FIG. 7 is a block diagram showing a computer loaded with an encrypted program executing apparatus according to a fourth embodiment of the present invention.

FIG. 7 is a block diagram of the whole configuration of a computer loaded with an encrypted program executing apparatus according to the fourth embodiment of the present invention. The one-chip microcomputer 40 comprises a CPU 41 for controlling the whole apparatus. The CPU 41 controls the operations of the respective circuits in the computer according to the programs stored in advance in an internal ROM 42. The one-chip microcomputer 40 also comprises a cache memory 43, a display controller 44 and a flip-flop 47 for storing control data for controlling a cache function of the cache memory 43. The ROM 42, cache memory 43 and display controller 44 are connected to the CPU 41 through a system bus 46 formed of a data bus, address bus and control bus.

The cache memory 43 is so constituted that a cache function (purging and writing of data) for a predetermined storage area is inhibited when the data is written into the storage area by the CPU 41 with an enforced write instruction. The flip-flop 47 is provided in correspondence with the predetermined storage area of the cache memory 43 into which the data is written under the enforced write instruction. Therefore, when the CPU 41 writes data into the cache memory 43 under the enforced write instruction, the flag is set in the flip-flop 47 so that the cache function of the cache memory 43 is inhibited. When the cache function is inhibited, the data in the cache memory 43 can be resident data.

The system bus 46 of the one-chip microcomputer 40 is connected to an external ROM 45 via an I/O buffer 48. A portion of the bus between the I/O buffer 48 and the external ROM 45 is called an external bus. The external ROM 45 stores a software program purchased from a software company (at least a part of which is encrypted) and a copyright claiming program which is also encrypted. The external ROM 45 is not limited to a semiconductor memory device, but may be a memory card. It is possible to down load programs into the external ROM 45 from a network.

When reading a program stored in the external ROM 45, the CPU 41 performs a control operation in accordance with the program. A decrypting program is previously written in the ROM 42. When the encrypted program (the copyright claiming program and at least part of the software program) is read, the program is executed after an encrypted portion thereof is decrypted. The decrypted program is stored in the cache memory 43 as a resident file. If the program read from the external ROM 45 is a non-encrypted program, the CPU 41 executes the program using a cache function for all areas of the cache memory 43. Since the I/O buffer 48 is connected between the system bus 46 and the external bus (external ROM 45), the contents of the ROM 42 including the decrypting program cannot be read out of the one-chip microcomputer 40.

Figure 8:
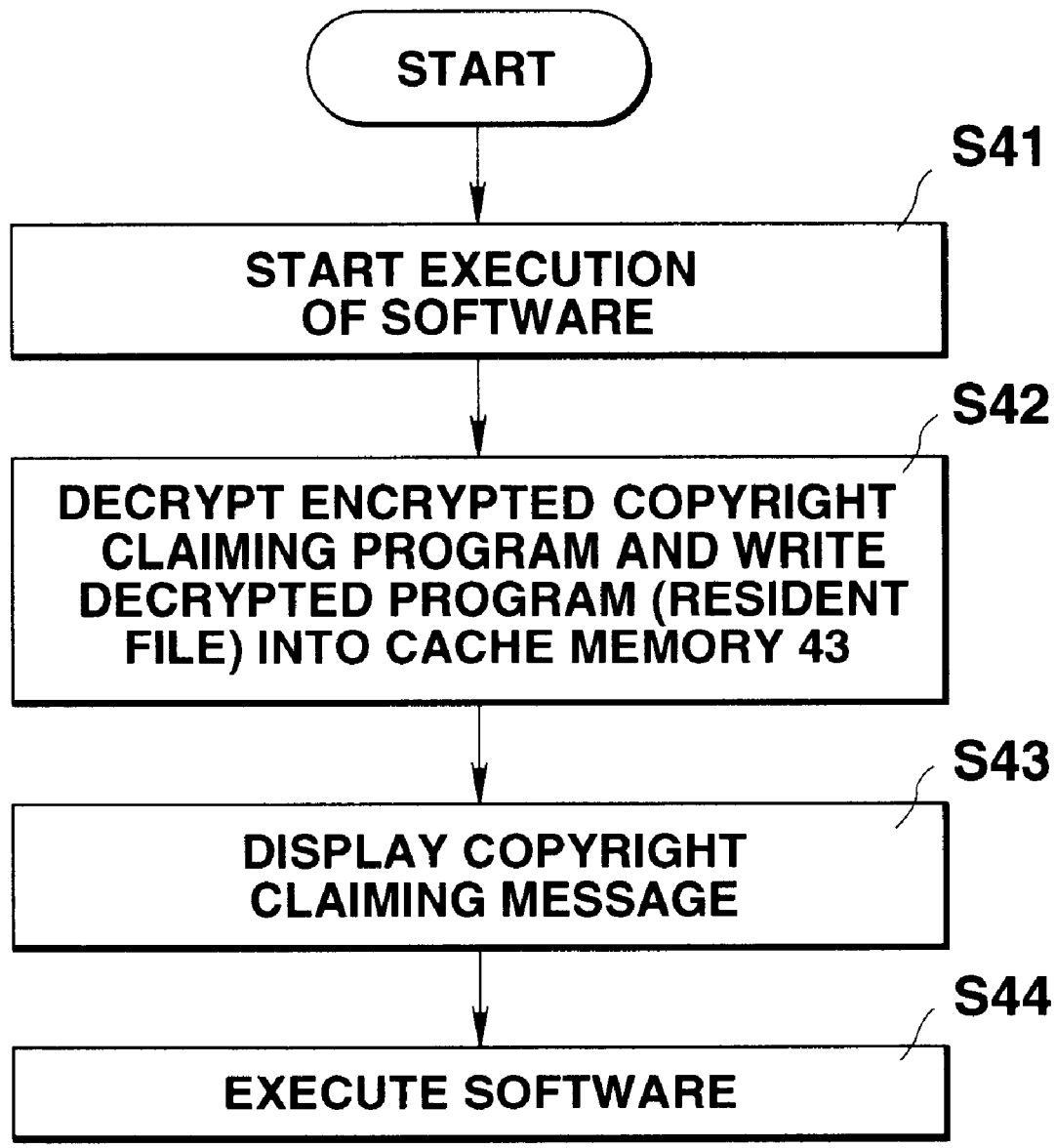
FIG. 8 is a flowchart showing a sequence of execution of an encrypted program according to the fourth embodiment of the present invention.

A software execution procedure of the computer loading an encrypted program executing apparatus having the above configuration according to the fourth embodiment, will now be described with reference to a flowchart shown in FIG. 8.

When the software starts at step S41, the encrypted copyright claiming program is taken into the one-chip microcomputer 40 and decrypted by means of the decrypting program stored in the ROM 42 as shown in step S42. The decrypted copyright claiming program is stored in the cache memory 43 as a resident file.

When the copyright claiming program starts at step S43, a copyright claiming message, for example, "Super Software Ver. 2.0, Copyright CASIO Co., Ltd." Is displayed on the display 47.

Then, the software is normally executed at step S44.

According to the fourth embodiment, the user can know the copyright of the software and recognize that the illegal copy of the software infringes the copyright before the execution of the software.

It is not possible to copy the software excluding the copyright claiming program in order to turn off the copyright claiming message due to the following reason. Since not only the copyright claiming program but also a part of the program necessary for the execution of the software are encrypted, it is not possible to delete the encrypted portion. Further, the encrypted portion cannot be decrypted similarly in the above embodiments. Therefore, it is not possible to turn off the copyright claiming message.

Industrial Applicability

According to the encrypted program executing apparatus of the present invention, the program decrypted by the decrypting program is stored in a memory. The decrypted program is inhibited from being read out and then from being copied. The specific information of the apparatus and an identification information which is deviated from the specific information and is given to a legal user of the encrypted program are verified so that the execution of the encrypted program is allowed/inhibited and an illegal usage of the encrypted program is inhibited.

Various modifications may be made without departing from the spirit or scope of the general inventive concept as defined by the appended claims and their equivalents. For example, the embodiments can be combined with one another.

What is claimed is:

1. An encrypted program executing apparatus for executing an encrypted program at least a part of which is encrypted, the apparatus comprising:

first memory means for storing a decrypting program;

decrypting means for decrypting the encrypted program by using the decrypting program stored in said first memory means, the decrypting means including a CPU, formed in an LSI, for executing the decrypting program stored in said first memory means;

second memory means, including a cache memory formed in the LSI, for storing a program decrypted by said decrypting means; and inhibiting means for inhibiting the decrypted program stored in said second memory means from being read out, the inhibiting means including a control register, formed in the LSI, to which an inhibit flag is set when said decrypting program is executed, and a cache function of said cache memory being inhibited if the inhibit flag is set in said control register.

2. An encrypted program executing apparatus for executing an encrypted program at least a part of which is encrypted, the apparatus comprising:

first memory means for storing a decrypting program;

decrypting means for decrypting the encrypted program by using the decrypting program stored in said first memory means, the decrypting means including a CPU, formed in an LSI, for executing the decrypting program stored in said first memory means;

secondary memory means, including a cache memory formed in the LSI, for storing a program decrypted by said decrypting means; and inhibiting means for inhibiting the decrypted program stored in said second memory means from being read out, the inhibiting means including a flip-flop, formed in the LSI, to which an inhibit flag is set when CPU executes an instruction to write the decrypted program into the cache memory, and a cache function of said cache memory being inhibited if the flag is set in said flip-flop.

3. An encrypted program executing apparatus for executing an encrypted program at least a part of which is encrypted according to claim 2, the apparatus further comprising:

loading means for loading a program including a copyright claiming program for displaying a copyright claiming message and a processing program at least a part of which is encrypted;

said decrypting means for decrypting the encrypted copyright claiming program by using the decrypting program stored in said first memory means;

said second memory means for storing a copyright claiming program decrypted by said decrypting means; and means for displaying the copyright claiming message based on the decrypted copyright claiming program stored in said second memory means.

4. An encrypted program executing apparatus for executing an encrypted program at least a part of which is encrypted, the apparatus comprising:

first memory means for storing a decrypting program;

decrypting means for decrypting the encrypted program by using the decrypting program stored in said first memory means, the decrypting means including a CPU, formed in an LSI, for executing the decrypting program stored in said first memory means;

loading memory means for loading a program including a password calculation program at least a part of which is encrypted;

second memory means for storing the password calculation program decrypted by said decrypting means;

third memory means for storing a specific information inherent to the encrypted program executing apparatus;

means for calculating a password based on the specific information stored in said third memory means, using the decrypted password calculation program stored in said second memory means; and means for comparing the user password input by said input means with the calculated password and in which execution of the encrypted program is inhibited if the user password does not coincide with the calculated password.

* * * * *